United States Patent [19]

Kopp

[11] 4,443,905
[45] Apr. 24, 1984

[54] LOADING RAMP

[76] Inventor: Clarence Kopp, 293 Fillmore St., Centerport, N.Y. 11721

[21] Appl. No.: 380,030

[22] Filed: May 20, 1982

[51] Int. Cl.³ .............................................. E01D 1/00
[52] U.S. Cl. .................................................... 14/69.5
[58] Field of Search .................. 14/69.5, 71.1; 49/463, 49/465; 16/239, 242, 387; 414/401

[56] References Cited

U.S. PATENT DOCUMENTS

| | | | |
|---|---|---|---|
| 2,607,937 | 8/1952 | Stone | 14/69.5 |
| 2,759,207 | 8/1956 | Pennington | 14/69.5 |
| 2,779,958 | 2/1957 | Hodges et al. | 14/69.5 |
| 3,030,645 | 4/1962 | Shaw | 14/69.5 |
| 3,102,583 | 9/1963 | Rowe et al. | 16/387 |
| 3,153,798 | 10/1964 | Drevitson | 14/69.5 |
| 3,164,965 | 1/1965 | Martin | 14/69.5 X |
| 3,599,382 | 8/1971 | Stone, Jr. | 14/71.1 X |
| 3,858,355 | 1/1975 | Root | 49/463 |
| 4,162,551 | 7/1979 | Serrano | 14/69.5 |
| 4,285,514 | 8/1981 | Romero | 14/69.5 X |

FOREIGN PATENT DOCUMENTS 680098 8/1939 Fed. Rep. of Germany ...... 414/401

Primary Examiner—James A. Leppink
Assistant Examiner—Beverly E. Hjorth
Attorney, Agent, or Firm—Bauer & Amer

[57] ABSTRACT

At least two plates hinged along a confronting pair of edges by hinge members having depending feet which hold the two plates slightly elevated along the hinge and allow the plates to assume relative positions which subtend whatever appropriate angle is necessary for the unhinged ends of the plates to establish contact with a loading dock surface and truck cargo area surface when the two plates are used as a ramp for transferring cargo on dollies or the like between the dock and truck.

3 Claims, 4 Drawing Figures

LOADING RAMP

The present invention relates generally to loading ramps, and more particularly to a readily assembled and disassembled ramp which is characterized by a sturdy construction capable of supporting significant weight, as well as having other noteworthy attributes.

As generally understood, loading ramps are used to span the clearace and also "bridge" the weight difference which usually exists between a loading dock and a truck which typically assumes an adjacent position thereto in order to load or unload cargo. One such loading ramp is described and illustrated in U.S. Pat. No. 2,759,207, and as shown therein typically employs a hinge to assist the ramp in assuming an operative spanning position between the loading dock and truck. However, in contemplation of significant weight being transported over the ramp and to avoid damage to the hinge, the construction of said hinge is of sturdy components and is typically not intended to be nor is it in practice, readily disassembled. Consequently, the ramp correspondingly is not readily disassembled, and thus it is usually too heavy to transport to other loading docks, and also is usually unwieldy both in size and weight for convenient storage during non-use.

Broadly, it is an object of the present invention to provide an improved loading ramp overcoming the foregoing and other shortcomings of the prior art. Specifically, it is an object to provide a hinged interconnected loading ramp which is readily disassembled to enhance its portability and preparatory to storage, but is nevertheless very sturdy in its assembled condition and capable of supporting significant weight thereon.

A loading ramp demonstrating objects and advantages of the present invention is of the type having an operative position in spanning relation over the space between a loading dock and a cargo platform of a truck or the like. Said loading ramp includes at least two planar body members presenting a cooperating pair of edges in adjacent position along which the body members are adapted to be hingedly connected to each other. More particularly, the hinge is formed of a select number, in spaced locations along each said body member edge, and also in a cooperating staggered relation to each other, of an operative arrangement of attached hinge members, each of which is identically constructed with a body bounding a cylindrical opening oriented substantially parallel to the edges. Further, each hinge member has a hinge-supporting foot member extending in depending relation therefrom. Completing the hinge is a hinge pin sized to be projected through an aligned arrangement of said cylindrical openings for hingedly interconnecting said body members along said cooperating edges thereof. Thus, in the spanning operative position of the loading ramp, said interconnected hinge members are supported in a clearance position on said foot members and an appropriate subtended angle between said body members is automaticaly assumed in order to allow for any height differences between said loading dock and said truck cargo platform.

The above brief description, as well as further objects, features and advantages of the present invention, will be more fully appreciated by reference to the following detailed description of a presently preferred, but nonetheless illustrative embodiment in accordance with the present invention, when taken in conjunction with the accompaying drawings, wherein.

Figure 1:
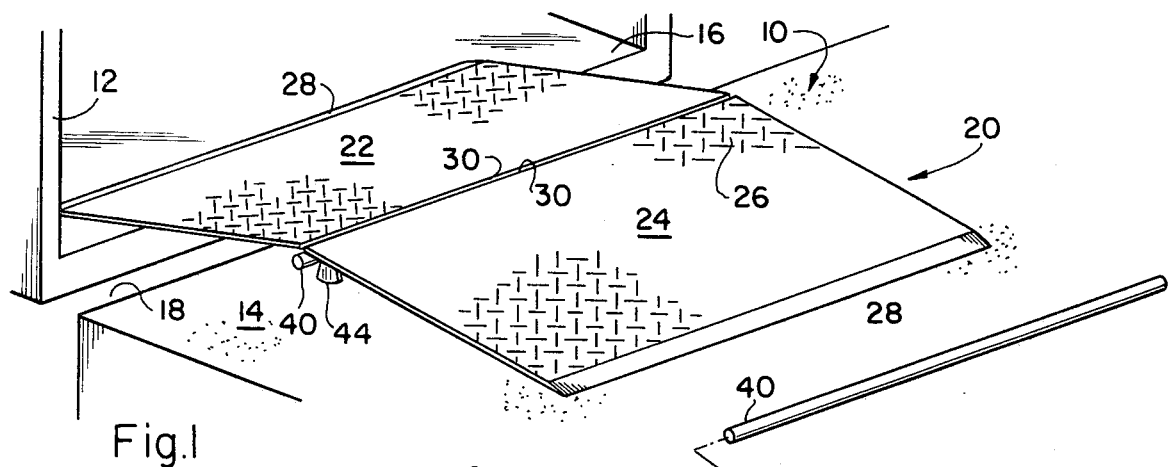
FIG. 1 is a perspective view of the within improved loading ramp in its operative position in spanning relation between a loading dock and the cargo platform of a truck in adjacent position to said loading dock.
Figure 3:
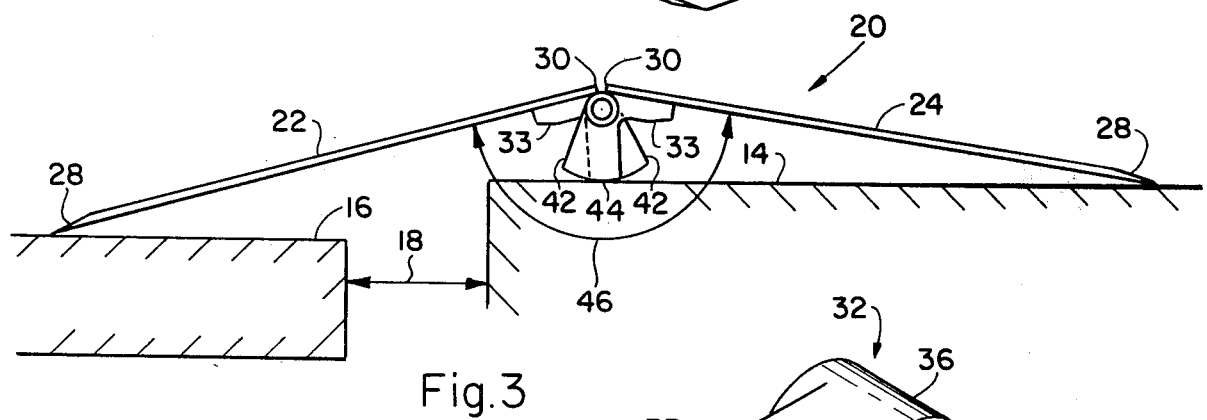
FIG. 3 is a side elevational view of the operative position of said loading ramp.

As is illustrated in FIG. 1, cargo is usually delivered to, or picked up, at a loading dock 10 by a truck 12 which occupies an adjacent position to the dock. Also, as is generally understood, the dock surface 14 and truck cargo area surface 16 may be at different heights or elevations. (See also FIG. 3). To span the clearance 18 between dock surface 14 and truck surface 16 and also to allow for the height difference therebetween, use is made of a loading ramp 20 in the operative spanning position as illustrated in FIGS. 1, 3.

Unlike prior art loading ramps, however, as described and illustrated for example in U.S. Pat. No. 2,759,207, the within ramp 20 is readily assembled from, and disassembled into a few components, such that in its disassembled condition it is readily transported and stored. Also, in its operative or assembled condition, it is very sturdy and can support significant weight even when the construction material is only aluminum in sheets, and there is an optimum minimum resistance to movement of dollies or other wheeled devices over its surface during the cargo-transferring service of the ramp. Other significant features and advantages of the loading ramp 20 hereof will become apparent as the description proceeds.

Figure 2:
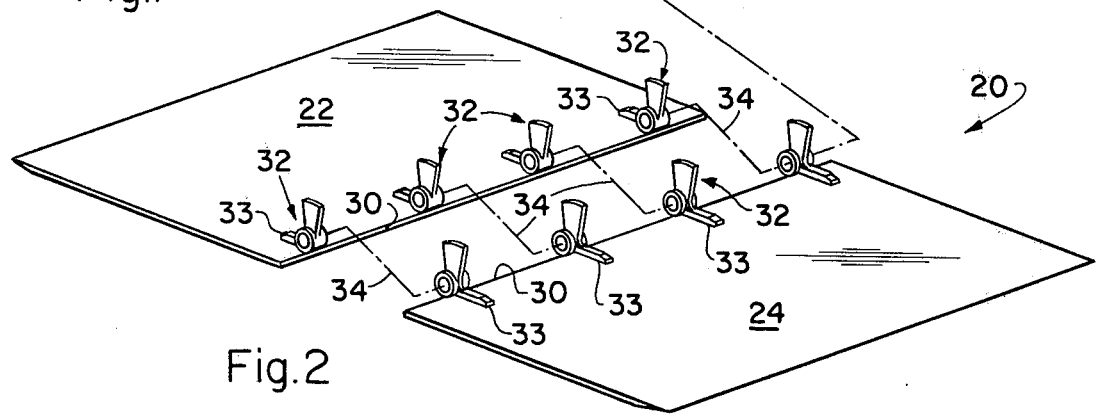
FIG. 2 is a disassembled view of the components of said loading ramp wherein the two bottom members thereof are turned upside down to better illustrate the structural features thereof.

As illustrated in the drawings, and particularly in FIGS. 1 and 2, in one preferred embodiment the inventive loading ramp 20 is comprised of two planar body members 22 and 24, of thin gauge sheet aluminum construction material with friction or non-slip patterns formed in their upper surfaces, as noted at 26. At opposite side edges 28 there are bevels to assist in rolling dollies, or other wheeled cargo carriers over these edges. At their opposite cooperating edges 30, the body members 22 and 24 are hingedly interconnected by novel hinge means, now to be described in detail.

Figure 4:
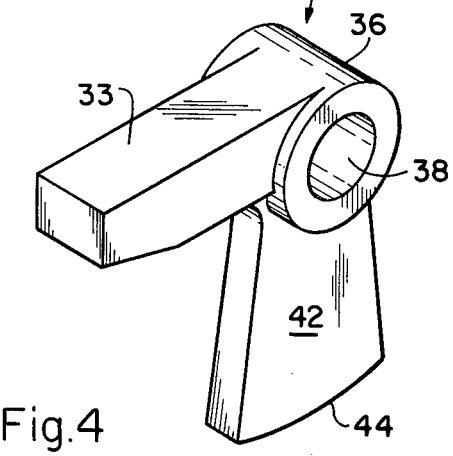
FIG. 4 is a perspective view, on an enlarged scale, of one of the several identical hinge member components of said ramp.

As may be understood from FIGS. 2 and 4, a select number, in this instance eight, identical hinge members, individually and collectively designated 32, are welded, as along the lugs 33, or otherwise appropriately attached in spaced relation along the edges 30. As illustrated in FIG. 2 and noted by the applied reference number 34, the hinge members 32 on the two edges 30 are in a staggered relationship. The reason for this, is that each member 32 has a cylindrical body 36 bounding a cylindrical hinge pin opening 38, and the staggered spacing thus aligns all of the openings 38 lengthwise of the edges preparatory to hingedly interconnecting the body members 22, 24, which is achieved by projecting a hinge pin 40 of appropriate length and diameter through said aligned openings 38.

Completing the construction of each identical hinge member 32 is a foot 42, which extends in depending relation from the cylinder 36 in the operative position of the ramp 20. The contact or bottom surface 44 of each foot is provided with a slight arc, preferably 50 degrees, which has been found effective to help establish contact for each foot, as at 44 (FIG. 3), all the way across the hinge 30, 32.

Thus, and as is best shown in FIG. 3, in the operative spanning position of the ramp 20, the hinged edges 30 are held in a slightly elevated position by the hinge foot members 42, and the two planar body members 22 and 24 are then able to assume relative positions which subtend whatever appropriate angle 46 is necessary for the ends or edges 28 of said body members to establish contact with the respective surfaces 14 and 16.

When the cargo-transferring service or use of the within ramp 20 is completed, it is contemplated that the assembly procedure as described in connection with FIG. 2 will be reversed, and the ramp thereby rendered significantly more portable for transportation and/or compact for storage. Yet, the ramp is readily assembled preparatory to use, and is of a noteworthy sturdy condition enabling significant weight to be moved over its surfaces 22, 24 between the dock 10 and the truck 12 with an optimum minimum obstruction presented to such movement by the hinged edges 30.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A loading ramp of the type having an operative position in spanning relation over the space between a loading dock and a cargo platform of a truck or the like, said loading ramp comprising at least two planar body members presenting a cooperating pair of edges in adjacent position along which said body members are adapted to be pivotally conneced to each other, a select number in spaced locations along each said body member edge and in a cooperating staggered relation to each other of an operative arrangement of attached hinge members, each said hinge member having a body bounding a cylindrical opening oriented substantially parallel to said edge and having a hinge-supporting foot member extending in depending relation therefrom, and a hinge pin sized to be projected through an aligned arrangement of said cylindrical openings for hingedly interconnecting said body members along said cooperating edges thereof, whereby in said spanning operative position of said loading ramp said interconnected edges of said body members are in a raised position supported on said foot members and edges opposite to said cooperating edges are in contact with said loading dock and said truck cargo platform respectively due to the angular position assumed by said body members about said hinge pin.

2. A loading ramp as defined in claim 1 wherein said lower end of each said hinge foot member is formed with an arcuate shaped edge so as to contribute to the establishing of contact between said foot member and a support surface at least at a point along said arcuate shaped edge of each said foot member.

3. A loading ramp as defined in claim 2 wherein each said hinge member includes a projection oriented substantially perpendicularly of said foot member to thereby facilitate the welding attachment along said hinge member in its operative position along said body member edge.

* * * * *